Oct. 11, 1932.  A. E. SPINASSE  1,882,262
APPARATUS AND METHOD FOR DRAWING GLASS
Filed July 6, 1927   3 Sheets-Sheet 1

Inventor
By Arthur E. Spinasse

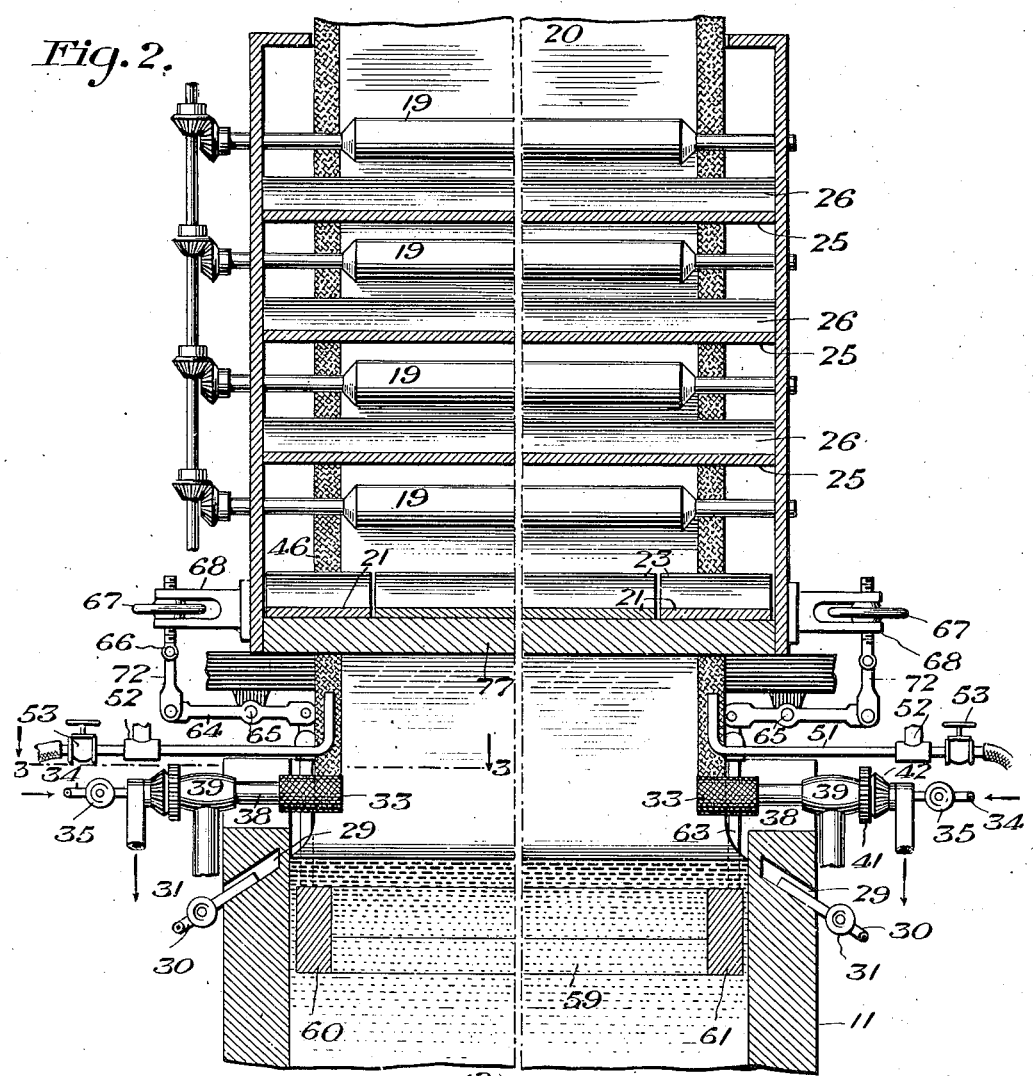

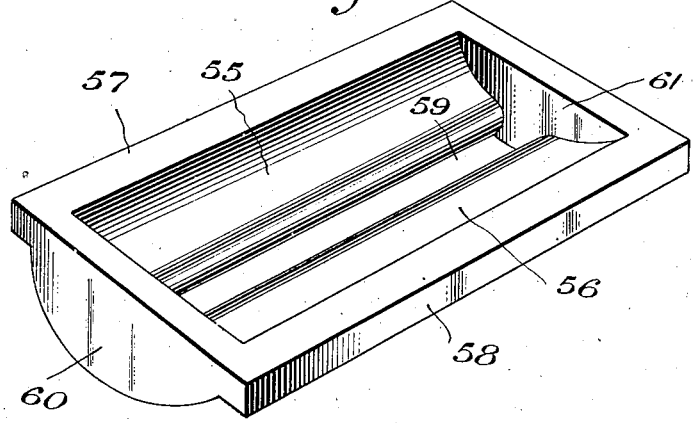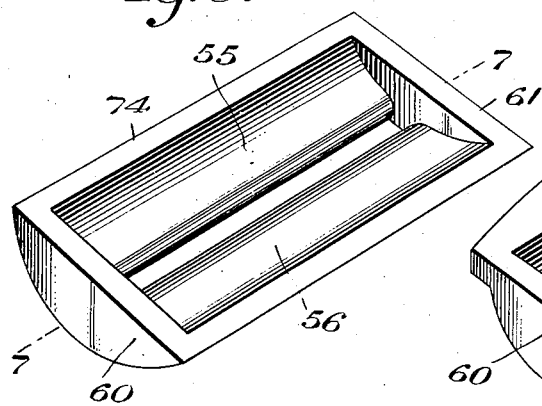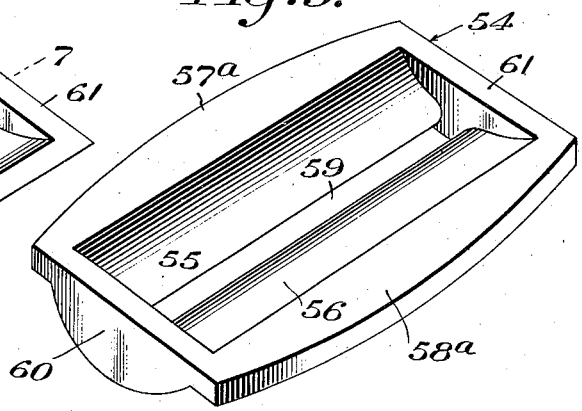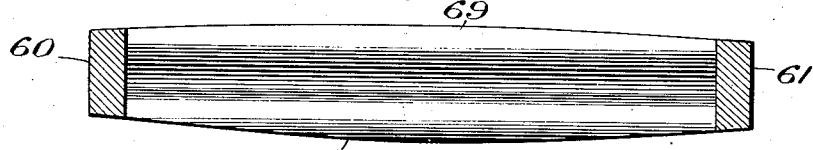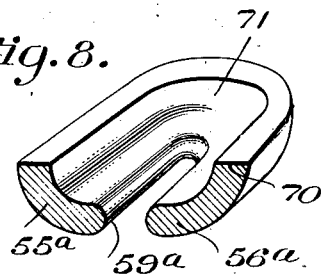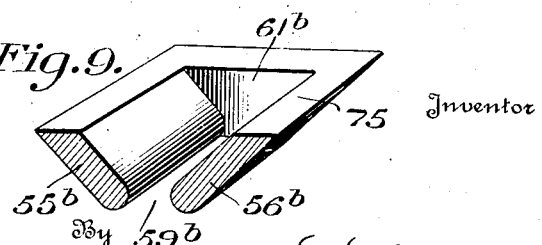

Patented Oct. 11, 1932

1,882,262

UNITED STATES PATENT OFFICE

ARTHUR E. SPINASSE, OF MOUNT VERNON, OHIO

APPARATUS AND METHOD FOR DRAWING GLASS

Application filed July 6, 1927. Serial No. 203,838.

The present invention relates to improvements in method and apparatus for drawing sheet glass, and has for an object the production of drawn sheet glass, bearing a closer resemblance to the more expensive plate glass and in which the sheets will be substantially devoid of waves, lines and similar blemishes.

It is another object of the present invention to provide an improved method and apparatus for the inexpensive production of commercial sheet glass in competition with the plate glass, wherein the glass supplied to form the sheet will be more homogeneous to provide a sheet of good texture, temper and transparency.

A further object of the present invention resides in providing an apparatus in which the parts are few and combined and assembled in an improved relative arrangement for successively acting upon the molten glass, meniscus and sheet to impart to the finished sheet qualities of plate glass which it has been heretofore impracticable to secure with prior apparatus and methods.

The foregoing and various other objects and advantages of this invention will be more fully described in and understood from the following detailed description of the present preferred embodiment thereof and the improved method or process of practicing the invention, and will be more particularly pointed out in the claims appended hereto.

In the drawings, wherein like symbols refer to like or corresponding parts throughout the several views, Figure 1 is a fragmentary vertical section taken through a tank furnace and apparatus constructed according to the present invention.

Figure 2 is also a vertical section taken on the line 2—2 in Figure 1.

Figure 3 is a horizontal section taken on the line 3—3 in Figure 2.

Figure 4 is a perspective view of a pot employed.

Figure 5 is a similar view showing a modified form of pot.

Figure 6 is also a perspective view of a further modified form of pot.

Figure 7 is a longitudinal section taken on the line 7—7 in Figure 6, but showing a modification in the structure.

Figure 8 is a fragmentary perspective view of still another form of pot, and

Figure 9 is a similar view of a further modification.

Figure 1:
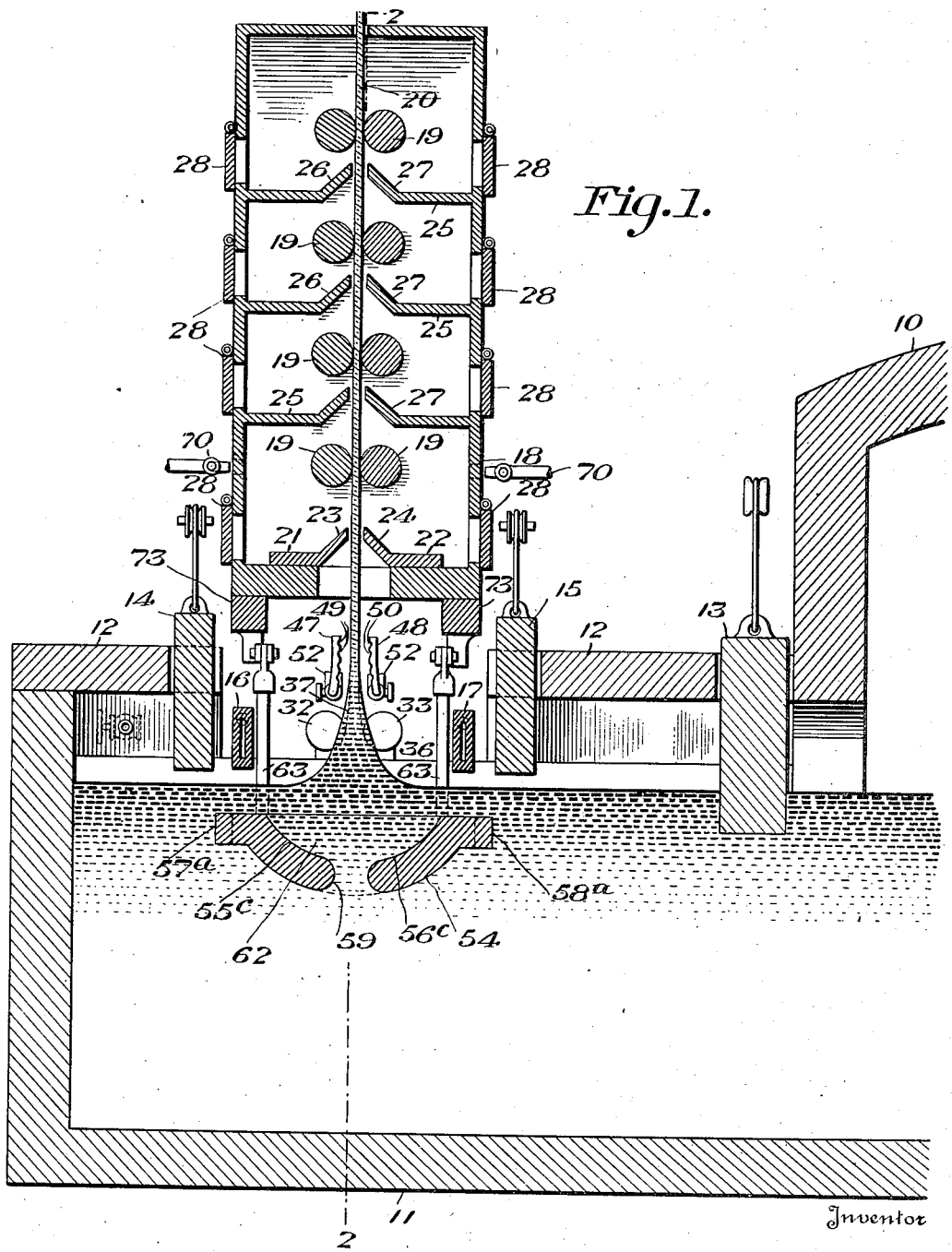

Referring more particularly to the drawings, 10 designates a tank furnace of conventional form, and 11 represents a deep tank communicating with the furnace and receiving molten glass therefrom, as shown in Figure 1. The roof of the tank is shown at 12 and beneath the roof is the drawing chamber. A damper 13 is shown as let adjustably in through the roof 12 adjacent the furnace to control the passage of the furnace heat to the drawing chamber. In the roof is an opening at the sides of which are the shields 14 and 15 mounted for vertical adjustment. Within the space between the shields 14 and 15 are located the adjustable coolers 16 and 17 and above the drawing zone is a vertical annealing leer 18 upon support 73 and containing the pairs of drawing rolls 19 mounted one above another to form a continuous vertical passage through the leer for the drawn sheet of glass indicated at 20.

Upon the floor 77 of the leer is a series of plates 21 and 22 preferably having upwardly inclined convergent lips 23 and 24 spaced apart at their near ends to form a slot through which the sheet 20 passes. These plates 21 and 22 are arranged transversely of the sheet on both sides thereof and may be independently adjustable as to positions toward and from the sheet to regulate the passage of the rising heat from the drawing zone at desired points in the leer and transversely of the sheet. In like manner the various floors or partitions 25 of the leer are provided with the upwardly extending lips 26 and 27. These lips are indicated to catch falling particles of the glass to prevent descent of same into the glass bath. Such glass débris is removed from the leer through doors 28.

As shown in Figure 2 the side walls of the deep tank 11 are provided with recesses 29, the inner ends of which are in the plane of the sheet 20 and closely adjacent the surface of the bath of glass whereby to form restricted anchorage points from which the edges of the sheet take form. These recesses 29 are arranged to receive cooling fluid through the pipes 30 under the control of valves 31. The intensity of the adherence of the glass or extent of anchorage upon the wall of the tank can be thereby maintained and regulated to maintain the desired width of the sheet and to regulate the thickness of the glass being drawn.

Border portions of the sheet 20 are received just above the glass bath by pairs of rolls 32 and 33, preferably knurled and hollow to receive through the pipes 34 under the control of valves 35 cooling fluid. The knurled rolls are spaced appropriately apart to engage the meniscus, wedge or blank 36 of the initially drawn border portions of the sheet, and as shown by dotted lines in Figure 1, these rolls are intended to partially reduce the thickness of the meniscus creating there above a supplementary meniscus 37, which draws upwardly into the finished edge thickness. The rolls are intended to be rotated in relatively opposite directions, at any desired speed preferably at substantially the same or lesser peripheral speed as the glass being drawn and in the same direction therewith. The rolls are mounted upon shafts 38 journaled through bearings 39. The shafts are provided with the inter-meshing gears 40 and 41, as shown in Figure 3. These pinions or gears are fast with the shafts and are fast or made with the beveled pinions 42 and 43 meshing respectively with beveled drive pinions 44 and 45 which receive rotation from any appropriate source of power. One of the bearings 39 may be yieldably mounted as it is well known in the art. The pipes 34 pass in axially of the shafts 38. As shown in Figure 2, the knurled rolls 32 and 33 impart to the knurled edges 46 of the sheet a correspondingly knurled condition. The surface portion of the rolls are preferably sufficiently smooth to allow for partial slipping action of the glass of the meniscus being drawn and shaped therebetween at the point of contact therewith. Preferably no drawing force being applied by the rolls to the border portions being drawn, such border portions being merely cooled to the desired temperature and rolled down to the desired thickness by said rolls, the width of the sheet of preference is maintained by the above described anchorages. These anchorages are confined within the walls of the tank and act to regulate the surface temperature of the walls of the tank on restricted points only, thereby preventing the formation of large areas of cooler glass in the bath.

The restricted points of anchorage when used to maintain the width of the sheet results in the formation of better edges and saving of much wasted cullet glass from the knurled border portion of the sheet, due to the fact, that the thickness of the glass being drawn between the rolls 32 and 33 can be effectively regulated and thinned down to the desired thickness. The drawing rolls 19, as shown in Figure 2, are of a length to engage the intermediate portion of the sheet 20, but they preferably terminate short of the knurled border portions 46 and consequently do not engage such knurled border portions.

Just above the rolls 32 and 33 and below the leer are disposed heating means. Such means preferably consists of pairs of upwardly extending pipe sections or ends 47 and 48 having numerous perforations 49 and 50 disposed opposite the knurled border portions. Flame is adapted to issue in minute jets or streams from the perforations 49 and 50. The pipe ends or sections are carried by the pipes 51, such as extending through supporting sleeves 52 and having valves 53 therein for controlling the flow of fuel to the burner orifices 49 and 50.

The pipes are in communication with appropriate sources of fuel supply. The pipes 51 may be turned angularly in the sleeve 51 to adjust the upstanding ends or nozzles 47 and 48 toward or from the knurled border portions 46 of the glass sheet, and in this way the temperature and application of heat may be regulated. The pipes 51 are also susceptible of a longitudinal or axial movement in the sleeve 52 to adjust the positions of the burner nozzles cross wise of the knurled border portions 46 or to remove the burners when desired.

Within the bath of glass in the deep tank 11 is submerged a pot 54, shown more particularly in Figures 1 and 5. This pot is of a generally oblong or rectangular form having the side walls 55 and 56 extending downwardly and inwardly from the lateral flanges 57ª and 58ª. The side walls 55 and 56 are preferably curved downwardly and inwardly to a central longitudinal bottom opening 59 in the plane of the sheet. The end walls of the pot are indicated at 60 and 61. The upper portion of the pot is open and wider than the bottom opening. This pot is adapted to be submerged beneath the glass bath in the deep tank 11, as shown in Figures 1 and 2 and to segregate a shallow pool 62 of glass immediately beneath the drawing zone. The pot is engaged by rods 63 for holding it in immersed position. These rods connect pivotally at their upper ends with levers 64 fulcrumed at 65 and adjustable angularly by the pivoted link 72 and the connected threaded rod 66 having the nut wheel 67 thereon. These nut wheels are confined against longitudinal travel by the brackets 68. By turning the wheel 67 the elevation or degree of submergence of the floating pot 54 may be regulated and by local adjustment of the rod 63, the pot may be given any desired degree of inclination or tilt with respect to the vertical axis of the meniscus.

Referring to Figure 5, a pot having all of the constructional characteristics described above is shown. Similar parts are similarly numbered. The form given this pot is generally ablong with the outer edges of the flanges 57ª and 58ª curved, the widest portion of the flanges being substantially centrally thereof and sloping off to reduced end portions.

The form of pot shown in Figure 4 is in part similar to structure shown in Figure 5, and has the central longitudinal bottom 59 and end walls 60 and 61. The walls 55 and 56 constitute cylindrical portions and have at their upper edges the horizontal flat flanges 57 and 58 which may have straight parallel outer edges as shown.

Figure 6 illustrates a form of pot similar to Figure 4 but with the top flanges 57 and 58 removed and with the upper faces 74 horizontal.

In Figure 7, a longitudinal section of this type of pot which may be used is illustrated, showing the upper faces of the walls 69 convex or uniformly and gradually curved from end to end. The bottom 76 of the pot may likewise be convex or curved as shown. By this curvature of the walls 69 or 76, which may be incorporated in any of the above described forms of pot, and by the horizontal curvature of the outer edges of the flanges 57ª and 58ª of Figure 5, the temperature and viscosity of the glass within the pot beneath and throughout the base of the sheet will be more uniform.

In Figure 8 a somewhat different form of pot is shown in which the side walls 55ª and 56ª are rounded in cross section and extend down to the longitudinal opening 59ª. The flanges are omitted in this form of pot and the upper edge 70 is substantially straight or horizontal. Moreover, the end portions 71 of the pot are rounded and merge with the side walls.

In Figure 9, the upwardly diverging side walls 55ᵇ and 56ᵇ are straight and are spaced apart at their lower edges to provide a central longitudinal bottom opening 59ᵇ in the plane of the sheet. The flanges are omitted at the upper portion of this pot and the upper edges 75 are preferably straight or horizontal. The end wall 61ᵇ is triangular and connects with the ends of the side walls. This pot is also of general oblong or rectangular configuration and with its upper opening larger in cross sectional area than the bottom opening thereof.

In operation, the molten glass flows slowly from the furnace 10 into the deep tank 11 and the large mass of the molten glass is maintained in this deep tank 11 forming a large supply for the interior pool 62, segregated by the pot 54. The glass flows in through the longitudinal central bottom opening 59 of the pot and also above and across the sides of the pot, the pot being held submerged at an appropriate distance by the adjusting rods 63. The upwardly flowing glass passing through the single restricted opening 59 spreads out within the enlarged portion of the pot directly beneath the meniscus to provide a homogeneous mass of glass in the pool directly below the drawing zone and the pool maintains a relatively shallow mass of glass directly beneath the meniscus 36. Moreover, shallow layers of glass are maintained above the flanges 57ª and 58ª slightly outside the meniscus 36. This segregating pot, container or reservoir within the bath, gathers and holds together a portion of molten glass of substantially the inverted shape of the wedge or meniscus being drawn and with said portion and the meniscus having a common base in the plane of the free surface layer of the molten glass merging into the meniscus. Thus the forces of anchorage at the intermediate and opposite side portions of the meniscus are uniformly and evenly distributed at all times during the draw. It also provides a homogeneous mass as the molten glass surrounding the pot continuously flows upwardly through the restricted opening 59, and merges through said opening the more or less scattered component ingredients or varying portions of the molten bath, so as to intimately commingle in the segregated portion those ingredients or varying portions which may not have been admixed in the bath to the extent required for the desired uniformity in the draw.

The shields 14 and 15 may be raised and lowered independently of one another to regulate the escape of the furnace heat or the heat in the drawing chamber, whereby to control the temperature of the glass laterally of the drawing zone and thus the temperature of the glass which flows at the surface of the bath from the drawing chambers to the space above the pot 54.

It will be clear that the surface of the bath above the submerged pot and beneath the shields, or thereabout and extending to the source of the sheet glass being drawn, is substantially entirely free and unobstructed during drawing. Good quality glass can thus be drawn in the sheet which would otherwise be marred or impaired by refractory walls projecting through the surface of the bath adjacent the drawing area. The glass is drawn upwardly into the meniscus 36 and sheet 20 by the drawing rolls 19, which are arranged in any number of superposed pairs whereby the sheet 20 is drawn up vertically through the leer 18.

These drawing rolls 19 may be made of metal or any desired material, smooth surfaces or covered with asbestos. They may extend transversely throughout the width of the sheet but preferably terminate short of the opposite edges of the sheet so as to leave the border portions of the sheet free, and to prevent the direct application of additional drawing force thereto. In starting the draw in this case, the bait will be wider than the length of the rolls. The border portions which can thus gradually cool free from direct contact with the drawing rolls 19, are of better temper, and the breakage thereof is thereby reduced to a minimum. By the time the sheet glass being drawn reaches the first or lower-most pair of drawing rolls 19 the sheet is sufficiently cooled to prevent the marring of the fire finished surfaces of the sheet by contact with said rolls.

The shields 14 and 15 may be so adjusted above the bath, and the plates 21 and 22 spaced more or less apart, and the members 16 and 17 so regulated as to position and temperature, to maintain a temperature in the drawing chamber and first chamber of the leer, such that the sheet will be substantially set when engaging the first set of rolls 19. However, the temperature may be regulated so that the sheet will still be slightly pliable, but far below that which is required for bending the sheet over a bending roll, to thereby impart a final degree of flatness to the sheet passing between said rolls 19. Independent controllable burners 78 may be provided through the walls of the leer to regulate the temperature of the sheet and rolls at desired points transversely of the sheet.

The border portions 46 of the sheet pass between the knurled cooled pairs of rollers 32 and 33. These rollers are spaced above the surface of the bath at a point suitable to engage the meniscus 36. This meniscus is partially reduced in passing between the rolls 32 and 33. The burners 47 and 48 above the pairs of rolls may be adjusted to maintain the border portions in a desired plastic and workable condition. The heat is applied through an appreciable longitudinal distance or area along the border portions by reason of the nature of the adjustable upturned pipe ends 47 and 48 and the vertical series of burner openings 49 and 50 therein. By adjusting these pipe ends in and out and angularly, and by regulating the amount of fuel through the valves 53, the desired plastic condition of the glass may be maintained.

Heretofore, where imitation plate glass has been drawn, the glass has been supplied from a shallow tank and the sheet bent horizontally over a bending roll. The shallow tank of small capacity has required a rapid flow or current in the glass applied to the drawing zone which has seriously impaired its homogeneity, resulting in the formation of vertical waves in the glass. Then when the glass was subsequently bent over the drawing rolls in a necessarily very hot and more or less soft condition, transverse waves were often produced and it has been very difficult and impracticable to eliminate this wavy condition of the glass which makes it a much less desirable commercial product.

In accordance with the present invention, the glass in the deep tank 11, owing to its great mass, will move slowly toward the drawing zone which will promote the homogeneity of the glass within the segregated pool 62 and permit the nice regulation of the temperature of the glass through the shields 14 and 15 and other cooperating parts of the apparatus employed. As a result, I am enabled to secure at the drawing zone a homogeneous glass of smooth texture and good temper capable of being drawn up into a relatively heavy meniscus and thick sheet 20. The border portion of this heavy sheet and meniscus passing between the knurled rolls 32 and 33 will be strongly anchored as required to maintain the width of the heavy sheet. These rolls may be spaced apart suitably so as to reduce the meniscus partially or wholly to the thickness of the sheet 20 required and the rolls may be rotated at the speed of draw, or at any other desired speed independently of the drawing rolls.

The burners 47 and 48 receiving the knurled border portions 46 from the rollers maintain the glass in a plastic and workable condition and partially relieve the chill imparted to the glass by the rollers 32 and 33.

In Figure 8 the bottom opening 59$^a$ terminates short of the end 71 to provide anchors for the ends of the sheet. The walls of the pot may be either rounded, as shown in Figure 8, or V shaped as shown in Figure 9. The present invention also relates to an improvement over my Patent No. 1,336,056, filed Oct. 16, 1915, and patented April 6, 1920, and Patent No. 1,674,530, a division thereof patented June 19, 1928.

It is obvious that various changes and modifications may be made in the details of construction and design of the above specifically described embodiment of this invention without departing from the spirit thereof, such changes and modifications being restricted only by the scope of the following claims.

What is claimed is:—

1. The herein-described method for drawing sheet glass in imitation of plate glass, which consists in maintaining a deep large mass of molten glass, forming a pool of glass from within the mass directly beneath the drawing zone, supplying glass from the mass to the pool laterally at surface level, controlling the temperature of the supplied glass adjacent the pool whereby to form in the pool glass of good texture and temper, drawing a meniscus and plate from the glass of the pool and carrying the sheet upwardly throughout the draw, subjecting the border portions of the meniscus to a strong anchoring and rolling cooling action, and subjecting the border portions only of the sheet after rolling to the action of heat.

2. In apparatus for drawing sheet glass in imitation of plate glass from an open bath, a deep tank for holding a large slowly moving body of molten glass, a pot submerged within the body for partially segregating in the mass of glass a pool of homogeneous glass fed from surface layers of glass over the sides of the pot, drawing means for drawing a meniscus and plate upwardly from the pool, cooled rollers for engaging the meniscus to subject the same to a strong rolling anchoring action, and heating means for the border portions only above said cooled rollers.

3. In apparatus for drawing sheet glass, a receptacle for containing an open bath of molten glass, a shallow pot of general oblong configuration, means for maintaining said pot entirely submerged below the surface of the bath, means for drawing the sheet from the free surface of the bath directly above said pot, pairs of cooling rolls for shaping the border portions of the meniscus of the sheet glass being drawn, and heating means arranged above said cooling rolls lengthwise of the border portions of the sheet and adjustable relatively thereto.

4. In apparatus for drawing sheet glass, a shallow pot of oblong configuration including means for maintaining said pot entirely submerged below the surface of the bath in line beneath the meniscus of the sheet, the walls of said pot gradually and uniformly decreasing the height from its middle portion to the ends thereof.

5. In apparatus for drawing sheet glass from a bath of molten glass, a receptacle for containing a bath of molten glass, a shallow pot of oblong configuration having a single central supply opening at its lowermost portion, means for holding said pot entirely submerged below the surface level of the bath transversely of the receptacle so that the surface of the glass thereabove, and adjacent thereto, will be substantially free and unobstructed, means for drawing the sheet from the free surface of the glass above said pot with the meniscus of the sheet in line with the glass within said pot, and pairs of internally cooled rolls for shaping the border portions of the meniscus.

6. In the process of drawing sheet glass, shaping an entirely submerged downwardly tapering pool of glass in the bath of molten glass with the pool deepest at its central portion and widest at its top near the surface level of the bath, drawing the meniscus of the sheet from a point directly above said deepest portion of the pool, and supplying said pool from a single point and at its lowest portion with upwardly flowing glass in a restricted stream from the subjacent bath.

7. In apparatus for drawing sheet glass, a single unit pot comprising a long narrow refractory body having a single glass pool receiving cavity therein and a glass admitting slot at the lowermost portion of the pot extending substantially throughout the length of the pot, the bottom walls of said pot decreasing in thickness gradually and uniformly from the central portion of the pot to the end portions thereof.

8. A glass sheet drawing pot having long side and short end walls and further having a feed slot in its bottom, the said pot having portions of increased thickness intermediate the ends of the pot.

9. A glass sheet drawing pot having long side and short end walls and further having a feed slot through its bottom, said pot being V-shape in cross section, and means for maintaining said pot wholly submerged in spaced relation beneath the surface of the bath and in line with the base of the forming sheet.

10. In apparatus for drawing sheet glass, the combination with a glass melting tank, of a glass drawing receptacle adapted to receive molten glass from said melting tank and connected therewith, wall members disposed above the glass to form a glass drawing area in said glass drawing receptacle, a vertical annealing leer above said glass drawing area, means within said vertical annealing leer for drawing the sheet from the free surface of said glass drawing area continuously upwardly through said vertical annealing leer, cooler members between said wall members and the base of the sheet glass being drawn from said area, a slotted refractory anchoring body of substantially the same length as that of the width of the sheet being drawn, means for holding said anchoring body bodily submerged within the glass bath beneath the drawing area, and pairs of edging rolls above the bath engaging and rolling down the border portions of the meniscus which forms the sheet.

11. In apparatus for drawing sheet glass, the combination with a glass melting tank, of a glass drawing receptacle adapted to receive molten glass from said melting tank and connected therewith, wall members disposed above the glass to form a glass drawing area in said glass drawing receptacle, a vertical annealing leer above said glass drawing area, means within said vertical annealing leer for drawing the sheet from the free surface of said glass drawing area continuously upwardly through said vertical annealing leer, cooler members between said wall members and the base of the sheet glass being drawn from said area, a refractory anchoring body of substantially the same length as that of the width of the sheet being drawn, means for holding said anchoring body bodily submerged within the glass bath beneath the drawing area, pairs of internally cooled edging rolls above the bath engaging and rolling down the border portions of the meniscus which forms the sheet, and means above said rolls for heating the rolled portions of the sheet.

In testimony whereof I affix my signature.

ARTHUR E. SPINASSE.